(12) United States Patent
Fan et al.

(10) Patent No.: US 12,619,256 B2
(45) Date of Patent: May 5, 2026

(54) METHOD AND APPARATUS FOR MOVABLE ROBOT TO ADJUST POSE OF GOODS RACK

(71) Applicant: Beijing Jingdong Qianshi Technology Co., Ltd., Beijing (CN)

(72) Inventors: Xiaoyan Fan, Beijing (CN); Jingren Tang, Beijing (CN)

(73) Assignee: Beijing Jingdong Qianshi Technology Co., Ltd., Beijing (CN)

( * ) Notice: Subject to any disclaimer, the term of this patent is extended or adjusted under 35 U.S.C. 154(b) by 164 days.

(21) Appl. No.: 18/022,202

(22) PCT Filed: Jan. 14, 2022

(86) PCT No.: PCT/CN2022/072023
§ 371 (c)(1),
(2) Date: Feb. 20, 2023

(87) PCT Pub. No.: WO2022/161186
PCT Pub. Date: Aug. 4, 2022

(65) Prior Publication Data
US 2025/0076894 A1     Mar. 6, 2025

(30) Foreign Application Priority Data

Jan. 29, 2021     (CN) .......................... 202110134237.9

(51) Int. Cl.
G05D 1/646          (2024.01)
G05D 1/656          (2024.01)
(Continued)

(52) U.S. Cl.
CPC ............. G05D 1/646 (2024.01); G05D 1/656 (2024.01); G05D 1/69 (2024.01); G06Q 10/087 (2013.01);
(Continued)

(58) Field of Classification Search
CPC .......... G05D 1/646; G05D 1/656; G05D 1/69; G06T 7/70
See application file for complete search history.

(56) References Cited

U.S. PATENT DOCUMENTS

2012/0328395 A1* 12/2012 Jacobsen ................... B66F 9/18
414/1
2017/0329347 A1* 11/2017 Passot ................. A47L 11/4061
(Continued)

FOREIGN PATENT DOCUMENTS

CN          103472584 A     12/2013
CN          105955259 A     9/2016
(Continued)

OTHER PUBLICATIONS

AZO Robotics, "A Guide to Robot Joint Design," 2018. (Year: 2018).*

(Continued)

*Primary Examiner* — Stephanie T Su
(74) *Attorney, Agent, or Firm* — Buchanan Ingersoll & Rooney PC

(57) ABSTRACT

Disclosed are a method and apparatus for a movable robot to adjust the pose of a goods rack. A particular embodiment of the method comprises: acquiring a goods rack identifier image of a target goods rack; identifying a pose identifier of the target goods rack from the goods rack identifier image, and determining the current pose of the target goods rack based thereon; in response to the difference between the current pose of the target goods rack and a preset pose being greater than a preset deviation threshold value, determining that the target goods rack has shifted; generating a transport path on the basis of the difference between the current pose of the target goods rack and the preset pose; and sending the
(Continued)

100

Acquire a goods rack identifier image of a target goods rack — 101

Identify a pose identifier of the target goods rack from the goods rack identifier image, and determine a current pose of the target goods rack based on the pose identifier of the target goods rack — 102

Determine that the target goods rack is shifted, in response to determining that a difference value between the current pose of the target goods rack and a preset pose is greater than a preset deviation threshold — 103

Generate, in response to determining that the target goods rack is shifted, a transport path based on the difference value between the current pose of the target goods rack and the preset pose — 104

Send the transport path to a movable robot to cause the movable robot to adjust the current pose of the target goods rack to be consistent with the preset pose according to the transport path — 105 transport path to a movable robot, such that the movable robot adjusts the current pose of the target goods rack.

18 Claims, 8 Drawing Sheets

(51) Int. Cl.

| | | |
|---|---|---|
| *G05D 1/69* | (2024.01) |
| *G06Q 10/087* | (2023.01) |
| *G06T 7/70* | (2017.01) |
| *G05D 105/20* | (2024.01) |
| *G05D 107/70* | (2024.01) |
| *G05D 111/10* | (2024.01) |

(52) U.S. Cl.
CPC ........... *G06T 7/70* (2017.01); *G05D 2105/20* (2024.01); *G05D 2107/70* (2024.01); *G05D 2111/10* (2024.01)

(56) References Cited

U.S. PATENT DOCUMENTS

| | | | |
|---|---|---|---|
| 2018/0211407 A1 | 7/2018 | Huang et al. | |
| 2020/0165083 A1 | 5/2020 | Huang et al. | |
| 2020/0223634 A1* | 7/2020 | Arase ..................... B25J 19/021 |
| 2020/0334620 A1* | 10/2020 | Yanagi ...................... G06T 7/00 |
| 2020/0339354 A1* | 10/2020 | Soto Arriaza ........ G06Q 10/087 |
| 2022/0088782 A1 | 3/2022 | Liu et al. | |

FOREIGN PATENT DOCUMENTS

| | | | |
|---|---|---|---|
| CN | 106347919 A | 1/2017 |
| CN | 106370185 A | 2/2017 |
| CN | 206014333 U | 3/2017 |
| CN | 106556341 A | 4/2017 |
| CN | 109189066 A | 1/2019 |
| CN | 109459032 A | 3/2019 |
| CN | 110002367 A | 7/2019 |
| CN | 110039543 A | 7/2019 |
| CN | 110622198 A | 12/2019 |
| CN | 111169894 A | 5/2020 |
| CN | 111204556 A | 5/2020 |
| CN | 111256676 A | 6/2020 |
| JP | 2016102003 A | 6/2016 |
| WO | 2020211565 A1 | 10/2020 |

OTHER PUBLICATIONS

AZO Robotics, "A Guide to Robot Joint Design" (Year: 2018).*
Laserax, "Data Matrix Codes vs. QR Codes—What is the Difference?" (Year: 2020).*
International Search Report and Written Opinion for International Application No. PCT/CN2022/072023, dated Mar. 28, 2022, 6 pages.

* cited by examiner

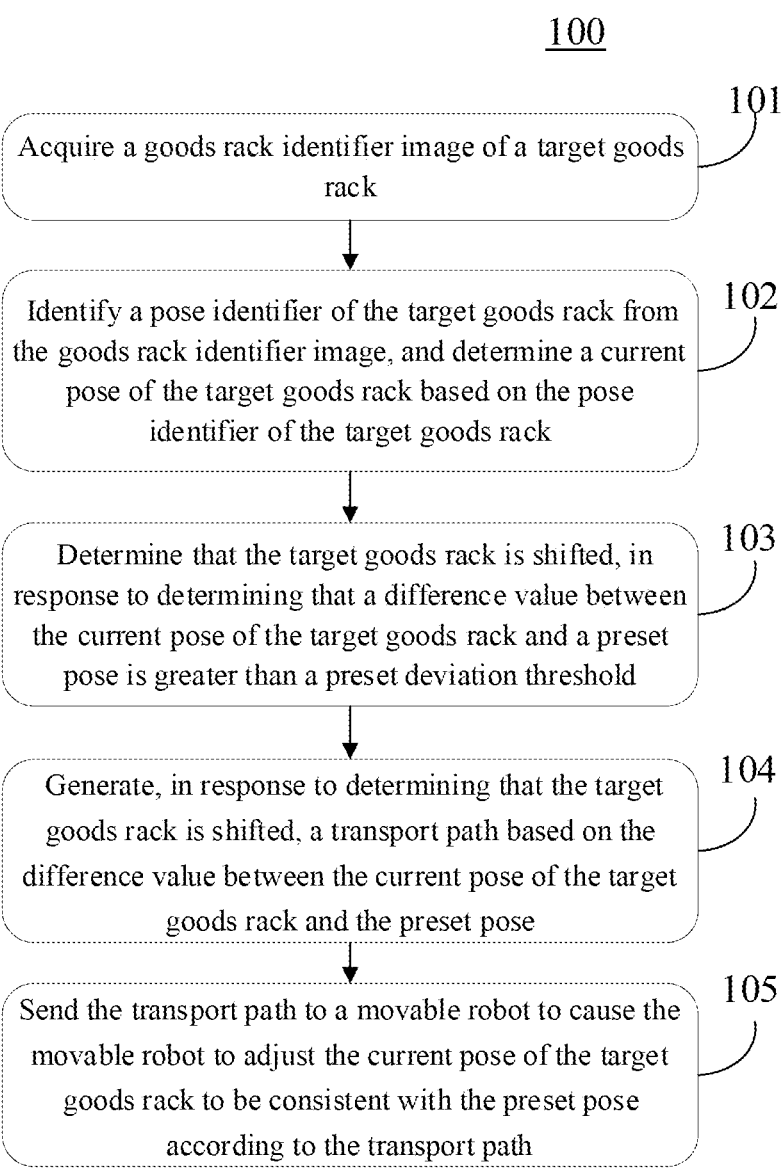

100

101
Acquire a goods rack identifier image of a target goods rack

102
Identify a pose identifier of the target goods rack from the goods rack identifier image, and determine a current pose of the target goods rack based on the pose identifier of the target goods rack 103
Determine that the target goods rack is shifted, in response to determining that a difference value between the current pose of the target goods rack and a preset pose is greater than a preset deviation threshold 104
Generate, in response to determining that the target goods rack is shifted, a transport path based on the difference value between the current pose of the target goods rack and the preset pose 105
Send the transport path to a movable robot to cause the movable robot to adjust the current pose of the target goods rack to be consistent with the preset pose according to the transport path

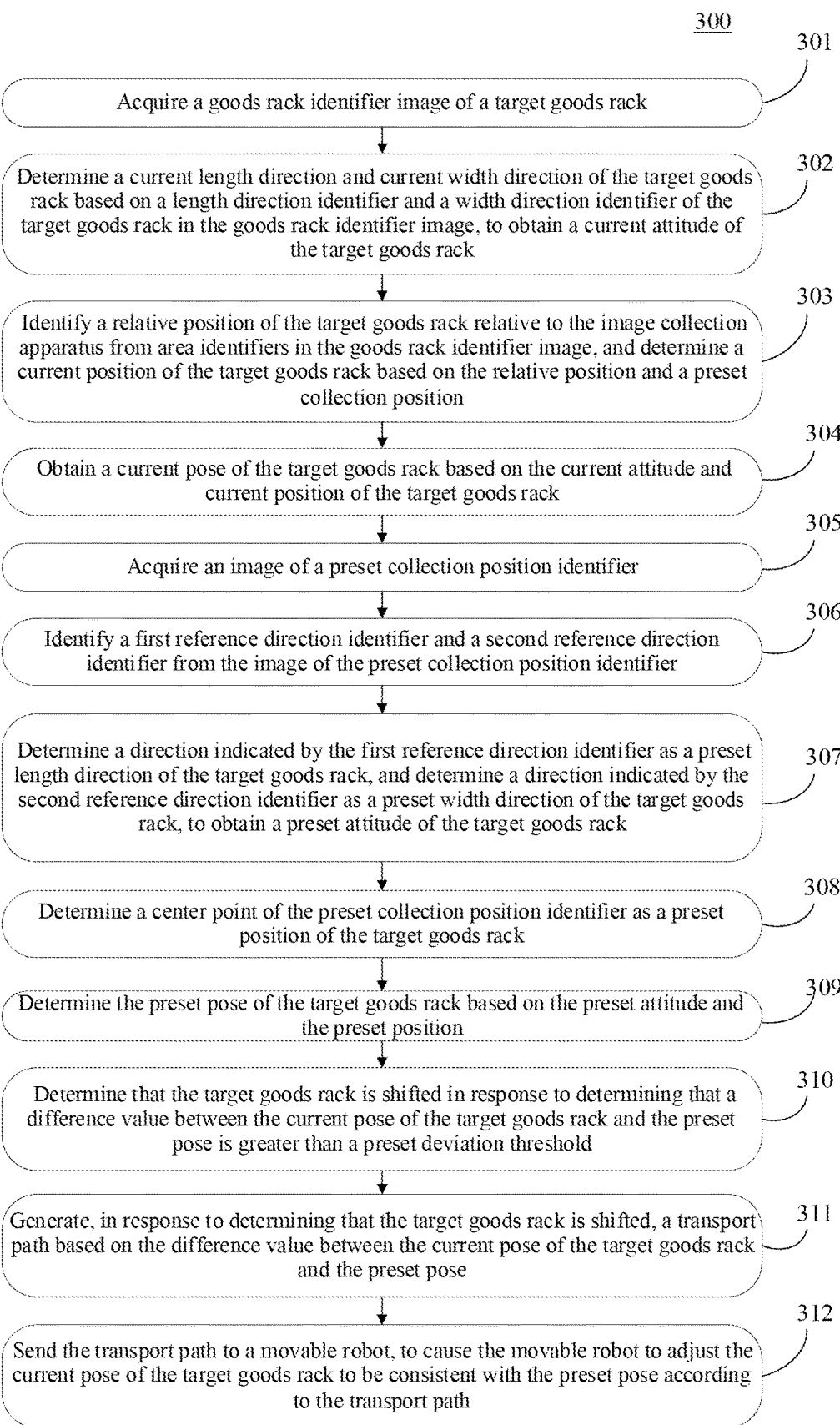

300

301

Acquire a goods rack identifier image of a target goods rack

302

Determine a current length direction and current width direction of the target goods rack based on a length direction identifier and a width direction identifier of the target goods rack in the goods rack identifier image, to obtain a current attitude of the target goods rack

303

Identify a relative position of the target goods rack relative to the image collection apparatus from area identifiers in the goods rack identifier image, and determine a current position of the target goods rack based on the relative position and a preset collection position

304

Obtain a current pose of the target goods rack based on the current attitude and current position of the target goods rack

305

Acquire an image of a preset collection position identifier

306

Identify a first reference direction identifier and a second reference direction identifier from the image of the preset collection position identifier

307

Determine a direction indicated by the first reference direction identifier as a preset length direction of the target goods rack, and determine a direction indicated by the second reference direction identifier as a preset width direction of the target goods rack, to obtain a preset attitude of the target goods rack

308

Determine a center point of the preset collection position identifier as a preset position of the target goods rack

309

Determine the preset pose of the target goods rack based on the preset attitude and the preset position

310

Determine that the target goods rack is shifted in response to determining that a difference value between the current pose of the target goods rack and the preset pose is greater than a preset deviation threshold

311

Generate, in response to determining that the target goods rack is shifted, a transport path based on the difference value between the current pose of the target goods rack and the preset pose

312

Send the transport path to a movable robot, to cause the movable robot to adjust the current pose of the target goods rack to be consistent with the preset pose according to the transport path

METHOD AND APPARATUS FOR MOVABLE ROBOT TO ADJUST POSE OF GOODS RACK

CROSS-REFERENCE TO RELATED APPLICATIONS

This application is a national stage of International Application No. PCT/CN2022/072023, filed on Jan. 14, 2022, which claims the priority from Chinese Patent Application No. 202110134237.9, filed on Jan. 29, 2021. The contents of each of the aforementioned applications are hereby incorporated by reference in their entireties.

TECHNICAL FIELD

Embodiments of the present disclosure relate to the field of computer technology, specifically to the field of smart warehouse, and particularly to a method and apparatus for adjusting a goods rack pose by a movable robot.

BACKGROUND OF THE INVENTION

Movable robots are widely used in smart warehouses and usually used to transport goods racks. In the process of transporting the goods racks, the movable robots may come into contact with surrounding goods racks, making the surrounding goods racks shifted.

In the related technology, the operating people usually observe the goods racks periodically, and manually correct the shifted goods racks.

SUMMARY OF THE INVENTION

Embodiments of the present disclosure propose a method and apparatus for adjusting a goods rack pose by a movable robot.

In a first aspect, some embodiments of the present disclosure provide a method for adjusting a goods rack pose by a movable robot. The method comprises: acquiring a goods rack identifier image of a target goods rack, wherein the goods rack identifier image is an image obtained by photographing a goods rack identifier of the target goods rack by an image collection apparatus at a preset collection position with a preset collection attitude, and the goods rack identifier comprises a pose identifier of the target goods rack; identifying the pose identifier of the target goods rack from the goods rack identifier image, and determining a current pose of the target goods rack based on the pose identifier of the target goods rack; determining that the target goods rack is shifted, in response to determining that a difference value between the current pose of the target goods rack and a preset pose is greater than a preset deviation threshold; generating, in response to determining that the target goods rack is shifted, a transport path based on the difference value between the current pose of the target goods rack and the preset pose of the target goods rack; and sending the transport path to the movable robot, to cause the movable robot to adjust the current pose of the target goods rack to be consistent with the preset pose of the target goods rack according to the transport path.

In a second aspect, some embodiments of the present disclosure provide an apparatus for adjusting a goods rack pose by a movable robot. The apparatus comprises: an image acquiring unit, configured to acquire a goods rack identifier image of a target goods rack, wherein the goods rack identifier image is an image obtained by photographing a goods rack identifier of the target goods rack by an image collection apparatus at a preset collection position with a preset collection attitude, and the goods rack identifier comprises a pose identifier of the target goods rack; an image identifying unit, configured to identify the pose identifier of the target goods rack from the goods rack identifier image, and determine a current pose of the target goods rack based on the pose identifier of the target goods rack; a pose determining unit, configured to determine that the target goods rack is shifted, in response to determining that a difference value between the current pose of the target goods rack and a preset pose is greater than a preset deviation threshold; a path generating unit, configured to generate, in response to determining that the target goods rack is shifted, a transport path based on the difference value between the current pose of the target goods rack and the preset pose of the target goods rack; and a path sending unit, configured to send the transport path to the movable robot, to cause the movable robot to adjust the current pose of the target goods rack to be consistent with the preset pose of the target goods rack according to the transport path.

In a third aspect, some embodiments of the present disclosure provide a movable robot, comprising a first image collection apparatus, a jacking-up apparatus, and a controller, where the first image collection apparatus is fixedly disposed on a vehicle body of the movable robot, and is configured to collect, in a vertical upward direction, an image of a goods rack identifier provided on a bottom surface of a goods rack; the jacking-up apparatus comprises a vertical motion component and a rotary motion component, the vertical motion component is connected to the rotary motion component and is configured to cause the rotary motion component to move along a vertical direction, and the rotary motion component is configured to cause the goods rack to rotate around the vertical direction; and the controller is in communication with the first image collection apparatus and the jacking-up apparatus, and is configured to perform operations in the above described method for adjusting a goods rack pose by a movable robot.

In a fourth aspect, some embodiments of the present disclosure provide a transport system. The transport system comprises: a goods rack, an automated guided vehicle, and the above described movable robot, wherein a center of a bottom surface of the goods rack is provided with a goods rack identifier, the automated guided vehicle is used to transport the goods rack, and the movable robot is configured to detect whether the goods rack is shifted, and adjust a pose of the shifted goods rack to a preset pose.

In a fifth aspect, some embodiments of the present disclosure provide a computer readable medium, storing a computer program, wherein the program, when executed by a processor, implements the method according to the first aspect.

BRIEF DESCRIPTION OF THE DRAWINGS

After reading detailed descriptions of non-limiting embodiments given with reference to the following accompanying drawings, other features, objectives and advantages of the present disclosure will be more apparent:

FIG. 1 is a flowchart of an embodiment of a method for adjusting a goods rack pose by a movable robot according to the present disclosure;

FIG. 3 is a flowchart of another embodiment of the method for adjusting a goods rack pose by a movable robot according to the present disclosure;

Figure 2A:
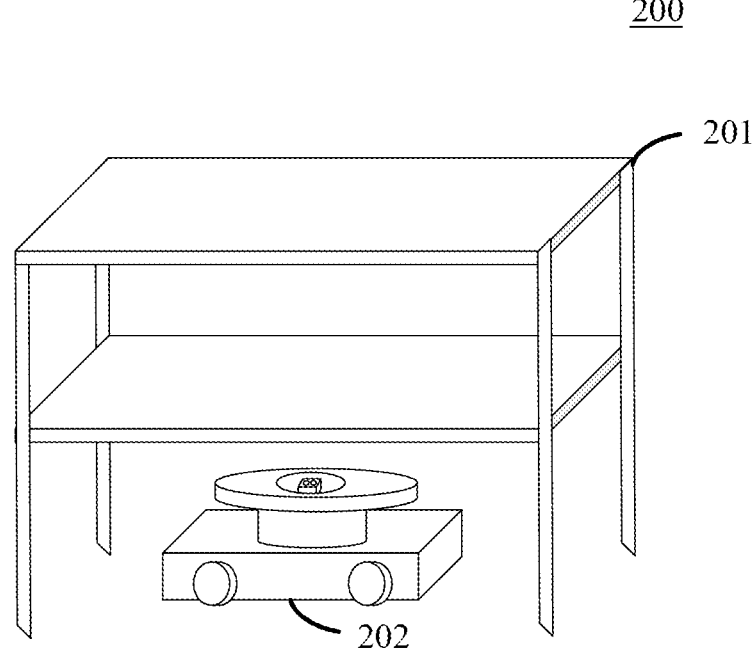
FIG. 2 is a schematic diagram of an application scenario of the method for adjusting a goods rack pose by a movable robot shown in FIG. 1.

Reference numerals: 401, First image collection apparatus; 402, Jacking-up apparatus; 403, Vertical motion component; 404, Rotary motion component.

DETAILED DESCRIPTION OF THE INVENTION

Embodiments of the present disclosure is further described below in detail in combination with the accompanying drawings. It may be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should be noted that embodiments in the present disclosure and the features in the embodiments may be combined with each other on a non-conflict basis. Embodiments of the present disclosure will be described below in detail with reference to the accompanying drawings.

FIG. 1 illustrates a flow 100 of a method for adjusting a goods rack pose by a movable robot according to an embodiment of the present disclosure. The flow includes the following steps.

Step 101, acquiring a goods rack identifier image of a target goods rack. Here, the goods rack identifier image is an image obtained by photographing, at a preset collection position with a preset collection attitude, a goods rack identifier of the target goods rack by an image collection apparatus, and the goods rack identifier comprises a pose identifier of the target goods rack.

In this embodiment, the pose identifier of a goods rack is used to represent the attitude information and position information of the goods rack in a horizontal plane. A preset collection position and a preset collection attitude when the image collection apparatus photographs the goods rack identifier are used to determine a camera extrinsic parameter of the image collection apparatus in advance. Accordingly, an electronic device (e.g., a terminal device running a WMS (Warehouse Management System)) on which the method for adjusting a goods rack pose by a movable robot runs may acquire, through a network, the goods rack identifier image collected by the image collection apparatus, and determine the current pose of the target goods rack in an actual scenario based on the pixel coordinates of the pose identifier in the collected goods rack identifier image, through a coordinate transformation algorithm in the field of image processing, and in combination with the camera extrinsic parameter and a camera intrinsic parameter of the image collection apparatus.

As an example, the goods rack identifier may be fixed onto the target goods rack (e.g., may be fixed onto the horizontal plane of the goods rack) in advance, and then the position information of the target goods rack is represented by the center point of the goods rack identifier. For example, the direction of the target goods rack may be marked in the form of an image (which may be, for example, an arrow) in the goods rack identifier. Key points evenly distributed are provided in the goods rack identifier, with the distance between any two adjacent key points being a preset fixed length. Accordingly, the electronic device on which the method for adjusting a goods rack pose by a movable robot runs may identify the current attitude of the target goods rack from the goods rack identifier image; determine a scaling coefficient of the goods rack identifier image by comparing a pixel distance between the key points in the goods rack identifier image with the preset fixed length, to further determine a relative position of the goods rack identifier relative to the image collection apparatus; and then obtain the current pose of the target goods rack in combination with the preset collection position of the image collection apparatus.

As another example, the goods rack identifier may further use an image with black and white grids arranged at intervals as the pose identifier of the target goods rack. The side length of each grid area is a calibration length, and the extension direction of the side length is parallel to the length direction or the width direction of the target goods rack. Thus, the position information and attitude information of the target goods rack may be simultaneously represented by the grid image.

In a specific example, the electronic device on which the method for adjusting a goods rack pose by a movable robot runs may be a controller of an AGV (Automated Guided Vehicle), and an image collection apparatus may be provided on the vehicle body of the AGV. When the AGV travels to the preset collection position, the image collection apparatus photographs, with the preset attitude, the goods rack identifier attached to the target goods rack, obtains the goods rack identifier image of the target goods rack, and sends the goods rack identifier image to the controller of the AGV.

Step 102, identifying a pose identifier of the target goods rack from the goods rack identifier image, and determining a current pose of the target goods rack based on the pose identifier of the target goods rack.

In this embodiment, the electronic device on which the method for adjusting a goods rack pose by a movable robot runs may identify the pose identifier of the target goods rack from the goods rack identifier image, determine the pixel coordinates of the pose identifier, and then determine the current pose of the target goods rack in combination with the camera extrinsic parameter and a camera intrinsic parameter of the image collection apparatus and a relative pose of the goods rack identifier relative to the target goods rack. For example, the current pose of the target goods rack may be represented in the form of a pose matrix.

It may be appreciated that the current pose includes current position information and current attitude information. For example, the current position information may be represented by coordinates, and the current attitude information may be represented by a direction vector.

It should be noted that it is a mature technique in the field of image processing that the position of each pixel in an image in an actual scenario is determined based on the pixel coordinates of the image, an camera extrinsic parameter and a camera intrinsic parameter, which is not limited in the present disclosure.

Step 103, determining that the target goods rack is shifted, in response to determining that a difference value between the current pose of the target goods rack and a preset pose is greater than a preset deviation threshold.

In this embodiment, the difference value between the current pose and the preset pose includes an attitude difference value and a position difference value. Here, the attitude difference value may be represented by a direction angle, for example, the direction angle between a length direction of the target goods rack in the current pose and a length direction of the target goods rack in the preset pose. Correspondingly, the deviation threshold also includes an attitude difference threshold and a position difference threshold.

As an example, based on the current GPS (Global Positioning System) coordinates of the target goods rack obtained in step 103 and preset GPS coordinates of the target goods rack, the electronic device on which the method for adjusting a goods rack pose by a movable robot runs may determine the difference value therebetween as the position difference value of the target goods rack. Then, based on the angle between the direction vector of the target goods rack obtained in step 103 and a preset direction vector, the electronic device may determine the deflection angle of the target goods rack relative to the preset attitude, that is, the attitude difference value of the target goods rack. Thereafter, the electronic device compares the position difference value with the position difference threshold value and compares the attitude difference value with the attitude difference threshold, respectively. If the two difference values are both not greater than the thresholds, it is determined that the target goods rack is not shifted. If one or both of the two difference values are greater than the thresholds, it is determined that the target goods rack is shifted.

Step 104, generating, in response to determining that the target goods rack is shifted, a transport path based on the difference value between the current pose of the target goods rack and the preset pose.

In this embodiment, the transport path is used to instruct a movable robot to transport a goods rack to adjust the current attitude of the goods rack to be consistent with the preset attitude.

As an example, the difference value between the current pose of the target goods rack and the preset pose, that is determined in step 103 by the electronic device on which the method for adjusting a goods rack pose by a movable robot runs, is: a direction angle of 30°, the distance in a first direction is −10 cm, and the distance in a second direction is 30 cm, where the plus and minus signs indicate reference directions. The transport path generated by the electronic device is then used to instruct the movable robot to perform following actions: rotating the target goods rack by −30° at the current position, and then making the target goods rack travel by 10 cm along the first direction and finally travel by 30 cm along the reverse direction of the second direction.

Step 105, sending the transport path to a movable robot to cause the movable robot to adjust the current pose of the target goods rack to be consistent with the preset pose of the target goods rack according to the transport path.

As an example, the electronic device on which the method for adjusting a goods rack pose by a movable robot runs may be a terminal device. The terminal device can perform, through a network, data interaction with the movable robot performing a transport task, to send the transport path to the movable robot.

As another example, the electronic device on which the method for adjusting a goods rack pose by a movable robot runs may alternatively be the controller of the movable robot. Accordingly, the controller of the movable robot may directly control the movable robot to move to the bottom of the target goods rack. Then, the movable robot lifts the target goods rack, and move according to the transport path, to adjust the attitude of the target goods rack and transport the target goods rack to the position pointed to by the preset pose, thereby completing the attitude correction for the target goods rack.

Figure 2B:
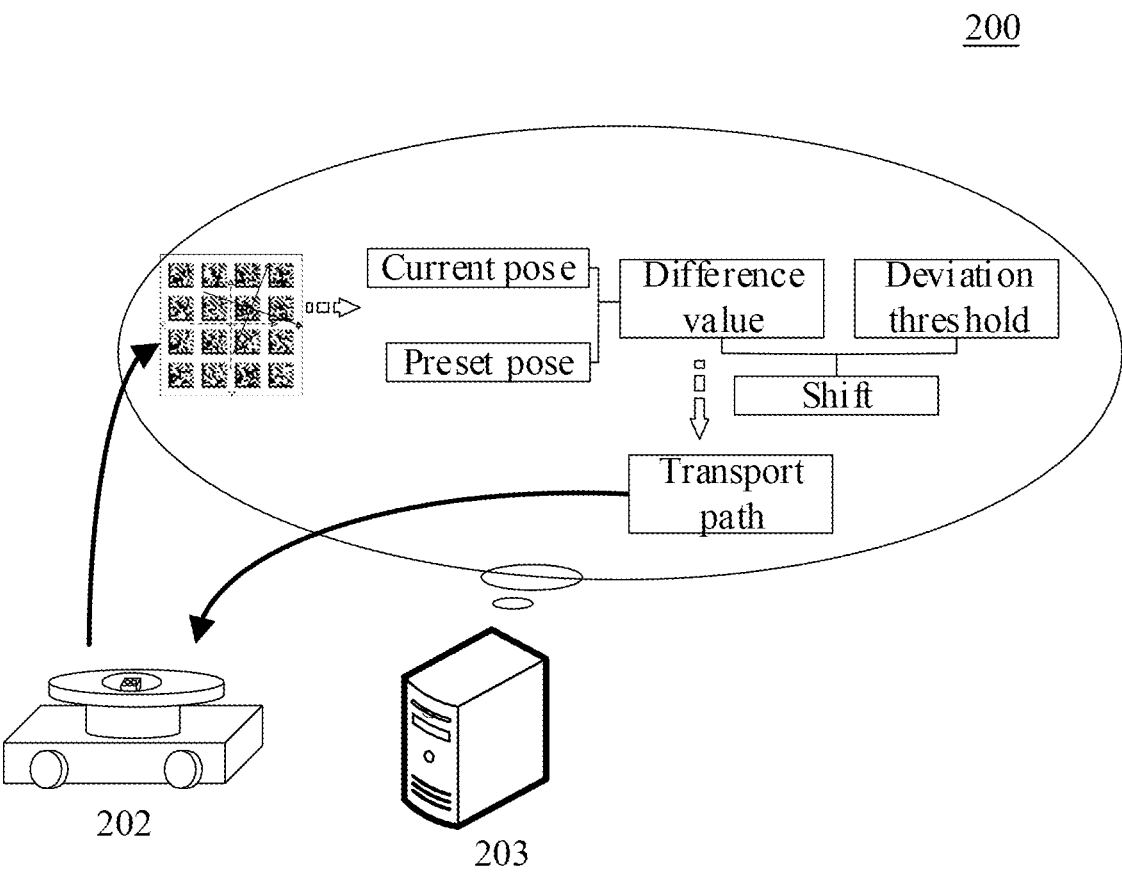
Figure 2C:
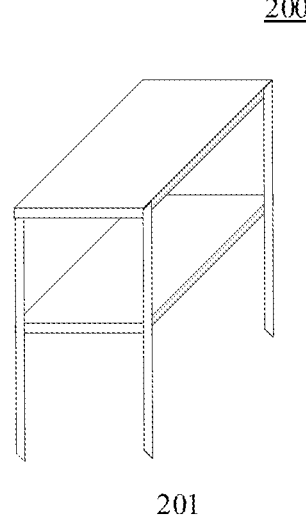

Further referring to FIG. 2, FIG. 2 is a schematic diagram of an application scenario of the method shown in FIG. 1. Referring first to the scenario shown in FIG. 2 (a), a goods rack identifier is provided on the bottom surface of a target goods rack 201, and the vehicle body of an AGV 202 is equipped with an image collection apparatus. After the AGV 202 travels to a preset collection position below the target goods rack, the image collection apparatus photographs the goods rack identifier to obtain a goods rack identifier image of the target goods rack 201. Next, referring to FIG. 2 (b), the AGV 202 sends the goods rack identifier image to a terminal device 203 through a network. The terminal device 203 identifies the acquired goods rack identifier image, determines the current pose of the target goods rack 201, and determines a difference value between the current pose and a preset pose. Then, whether the target goods rack 201 has been shifted is determined by comparing the difference value with a preset deviation threshold. If it is determined that the target goods rack 201 is shifted, a transport path is generated based on the difference value between the current pose and the preset pose, and the transport path is sent to the AGV 202 to instruct the AGV 202 to adjust the pose of the target goods rack 201 according to the transport path. As shown in FIG. 2 (c), the attitude of the target goods rack 201 after the pose adjustment is completed is consistent with a preset attitude.

The goods rack that is shifted will affect the transport task of the movable robot, which brings potential safety hazards to the operation of the warehouse. According to the method and apparatus for adjusting a goods rack pose by a movable robot provided in the present disclosure, the current pose of the target goods rack can be determined based on the goods rack identifier, and whether the target goods rack is shifted is determined through the difference value between the current pose and the preset pose. If the target goods rack is shifted, the transport path is generated based on the difference value between the current pose and the preset pose, to instruct the movable robot to adjust the pose of the target goods rack to be consistent with the preset pose, thereby realizing the automatic detection and correction for the pose of the goods rack, and thus, the operation cost of the warehouse can be reduced.

Further referring to FIG. 3, FIG. 3 illustrates a flow 300 of the method for adjusting a goods rack pose by a movable robot according to another embodiment of the present disclosure, the flow 300 of the method for adjusting a goods rack pose by a movable robot includes the following steps:

Step 301, acquiring a goods rack identifier image of a target goods rack.

In this embodiment, the projection of the center point of a goods rack identifier onto a horizontal plane coincides with the projection of the center point of the target goods rack onto the horizontal plane. The pose identifier includes a length direction identifier of a goods rack, a width direction identifier of the goods rack, and a distance identifier. The distance identifier includes a plurality of area identifiers evenly distributed within the region of the goods rack identifier, and each area identifier represents a relative position of the area where the area identifier is located from the center point of the goods rack identifier.

In this embodiment, the position of the center point of the goods rack identifier in the horizontal plane may represent the horizontal position of the target goods rack.

As an example, the length direction and width direction of the target goods rack may be marked in the form of an arrow icon in the rack identifier. Accordingly, the electronic device, on which the method for adjusting a goods rack pose by a movable robot runs, may determine the current attitude of the target goods rack only by identifying the direction pointed out by the arrow icon in the goods rack identifier image.

In another example, the attitude of the target goods rack may also be represented in the following way: a goods rack coordinate system is established with the center point of the goods rack identifier as an original and the length direction and width direction of the target goods rack as coordinate axes, and the coordinate axes are marked in the form of an image in the goods rack identifier. Accordingly, the electronic device, on which the method for adjusting a goods rack pose by a movable robot runs, can identify the goods rack coordinate system from the goods rack identifier image, and determine, through the goods rack coordinate system and an image coordinate system in an image collection apparatus, the relative pose of the target goods rack relative to an image collection device. Then, further in combination with a preset collection position and preset collection attitude of the image collection apparatus in an actual scenario, the electronic device can determine the current pose of the target goods rack.

In this implementation, the relative position information of each area in the goods rack identifier relative to center point of the goods rack identifier can be encoded in advance, and the area identifier can be generated.

As an example, the goods rack coordinate system may be established in advance with the center point of the goods rack identifier as the origin and the length direction and width direction of the target goods rack as the coordinate axes. Then, the coordinates of the center point of each area in the goods rack coordinate system are used as the relative position information of the each area, and the relative position information is encoded to generate an image that can be identified by an image recognition model (e.g., a coordinate value can be directly embedded into the area identifier), thus obtaining the area identifier of the each area.

In a specific example, a two-dimensional code image may be used as an area identifier. Each two-dimensional code image is a square with equal side lengths, and an extension direction of the side length of the two-dimensional code image is parallel to the length direction or width direction of the target goods rack. Then, the relative position of the center point of the area where the two-dimensional code image is located relative to the center point of the goods rack identifier is encoded into a two-dimensional code image. Accordingly, the image collection apparatus can determine the pixel coordinates of the center point of the target goods rack only by identifying the information located in the center area of the goods rack identifier image and represented by a two-dimensional code. That is, the image collection apparatus obtains the relative position of the target goods rack relative to the image collection apparatus. Then, the length direction and width direction of the target goods rack are determined according to the extension directions of the image side lengths of the two-dimensional code. Thus, the relative attitude of the target goods rack relative to the image collection apparatus is determined. The relative pose of the target goods rack relative to the image collection apparatus can be obtained by combining the relative position and relative attitude of the target goods rack. Then, the current attitude of the target goods rack in the actual scenario can be determined by combining the preset collection position and preset collection attitude of the image collection apparatus in the actual scenario.

Step 302, determining a current length direction and a current width direction of the target goods rack based on a length direction identifier and a width direction identifier of the target goods rack in the goods rack identifier image, to obtain a current attitude of the target goods rack.

In this embodiment, the electronic device, on which the method for adjusting a goods rack pose by a movable robot runs, can use an image recognition model to identify the length direction and width direction of the target goods rack from the goods rack identifier image obtained in step 301. For example, an image mark that is used to represent the length direction and width direction of the target goods rack, a coordinate axis or an extension direction of a side length of an area in the goods rack identifier image, can be identified. Accordingly, the relative attitude of the target goods rack relative to the image collection apparatus can be determined. Then, the current attitude of the target goods rack can be determined in combination with the preset collection attitude of the image collection apparatus.

Step 303, identifying a relative position of the target goods rack relative to the image collection apparatus from area identifiers in the goods rack identifier image, and determining a current position of the target goods rack based on the relative position of the target goods rack relative to the image collection apparatus and a preset collection position.

In this embodiment, the electronic device, on which the method for adjusting a goods rack pose by a movable robot runs, can use the area identifier of the center area of the goods rack identifier image as a target area identifier representing the relative position of the target goods rack relative to the image collection apparatus, then can obtain the relative position of the target goods rack relative to the image collection apparatus by identifying the relative position of this area relative to the center point of the goods rack identifier (i.e., the center point of the target goods rack) from this area identifier, and then can determine the current position of the target goods rack in combination with the position (the preset collection position) of the image collection apparatus in the actual scenario.

Step 304, obtaining a current pose of the target goods rack based on the current attitude and current position of the target goods rack.

As an example, the electronic device, on which the method for adjusting a goods rack pose by a movable robot runs, may characterize, in the form of vectors, the current attitude and current position of the target goods rack that are obtained in step 302 and step 303, and then combine the vectors according to a rule of a pose matrix. The obtained pose matrix can thus represent the current pose of the target goods rack.

In the method for adjusting a goods rack pose by a movable robot provided in this embodiment, a preset pose of the target goods rack may be determined using steps 305 to 309.

Step 305, acquiring an image of a preset collection position identifier.

In this embodiment, the preset collection position is provided with the preset collection position identifier. The preset collection position identifier includes a first reference direction identifier and a second reference direction identifier.

In some alternative implementations of this embodiment, the preset collection attitude of the image collection apparatus may be determined based on the first reference direction identifier and the second reference direction identifier, such that the direction of a coordinate axis in the image coordinate system of the image collection apparatus is parallel to the direction indicated by the first reference direction identifier or the second reference direction identifier. Accordingly, the angles of the length direction and the width direction of the target goods rack in the goods rack identifier image relative to the image coordinate system are linearly related to the difference value between the current attitude of the target goods rack and the preset attitude. The electronic device, on which the method for adjusting a goods rack pose by a movable robot runs, can determine the difference value between the current attitude of the target goods rack and the preset attitude in combination with a scaling coefficient of the image collection apparatus and through a linear calculation.

As an example, the electronic device, on which the method for adjusting a goods rack pose by a movable robot runs, may be a controller of an AGV. The AGV is loaded with two cameras, and the image coordinate system of the images generated by the two cameras is parallel or perpendicular to the travel direction of the AGV. Here, the photography angle of a first camera is vertically upward and used to photograph the goods rack identifier of the target goods rack. The photography angle of a second camera is vertically downward and used to photograph the preset collection position identifier. The AGV travels toward the target goods rack, and in this process, when the center point of the preset collection position identifier captured by the second camera coincides with the center point of the second camera, it represents that the AGV has arrived at the preset collection position, and the AGV stops moving. Then, the controller of the AGV identifies the first reference direction identifier and the second reference direction identifier from the preset collection position identifier, and adjusts the pose of the AGV based on the directions indicated by the first reference direction identifier and the second reference direction identifier. For example, the controller can use the direction indicated by the first reference direction identifier as the travel direction of the AGV. Accordingly, the determination for the preset collection position and preset collection attitude of the first camera is implemented, the direction of a coordinate axis in the image coordinate system of the first camera is parallel or perpendicular to a preset length direction or preset width direction of the target goods rack.

Step 306, identifying a first reference direction identifier and a second reference direction identifier from the image of the preset collection position identifier.

Step 307, determining a direction indicated by the first reference direction identifier as a preset length direction of the target goods rack, and determining a direction indicated by the second reference direction identifier as a preset width direction of the target goods rack, to obtain a preset attitude of the target goods rack.

In this embodiment, the electronic device on which the method for adjusting a goods rack pose by a movable robot runs can determine the preset attitude of the target goods rack from the preset collection position identifier through steps 306 and 307.

Further, if the preset attitude of the image collection apparatus is determined based on the first reference direction identifier and the second reference direction, the image coordinate system of the image collection apparatus is parallel to a preset attitude coordinate system of the target goods rack, which is conducive to reducing the amount of data for computation and improving the computational efficiency.

Step 308, determining a center point of the preset collection position identifier as a preset position of the target goods rack.

In this embodiment, the preset collection position when the image collection apparatus collects an image is determined as the preset position of the target goods rack, such that projection of the center point of the image photographed by the image collection apparatus onto the horizontal plane coincides with the projection of the preset position of the target goods rack onto the horizontal plane. In this way, the relative position of the center point of the gods rack identifier relative to the center point of the goods rack identifier image is linearly related to the difference value between the current position of the target goods rack and the preset position of the target goods rack. The electronic device, on which the method for adjusting a goods rack pose by a movable robot runs, can determine the difference value between the current position of the target goods rack and the preset position of the target goods rack only in combination with the scaling coefficient of the image collection apparatus, thereby reducing the amount of computation and improving the computational efficiency.

Step 309, determining the preset pose of the target goods rack based on the preset attitude of the target goods rack and the preset position of the target goods rack.

In this embodiment, through steps 305-309, the electronic device, on which the method for adjusting a goods rack pose by a movable robot runs, can identify the preset pose of the target goods rack from the preset collection position identifier.

The description is further performed in combination with the example in step 305. The center of the first camera and the center of the second camera are collinear with the center of the AGV in a vertical direction. Accordingly, when the AGV is adjusted to the preset collection attitude at the preset collection position, the direction of a coordinate axis in the image coordinate system of the first camera is parallel or perpendicular to the preset length direction of the target goods rack. Accordingly, the electronic device, on which the method for adjusting a goods rack pose by a movable robot runs, can use a linear transformation to determine the difference value of the target goods rack relative to the preset pose of the target goods rack based on the relative pose of the target goods rack in the goods rack identifier image. Therefore, the amount of data for the computation is reduced, and the computational efficiency is improved.

Step 310, determining that the target goods rack is shifted in response to determining that a difference value between the current pose of the target goods rack and the preset pose is greater than a preset deviation threshold.

Step 311, generating, in response to determining that the target goods rack is shifted, a transport path based on the difference value between the current pose of the target goods rack and the preset pose.

Step 312, sending the transport path to a movable robot, to cause the movable robot to adjust the current pose of the target goods rack to be consistent with the preset pose according to the transport path.

Steps 310-312 correspond to the foregoing steps 103-105, and thus will not be repeatedly described here.

As can be seen from FIG. 3, the flow 300 of the method for adjusting a goods rack pose by a movable robot in this embodiment emphasizes the following contents: the current attitude of the target goods rack is determined by identifying the length direction and width direction of the target goods rack in the goods rack identifier; the current position of the target goods rack is determined by identifying the area identifier; and the preset pose of the target goods rack is determined by identifying the preset collection position identifier. This helps to reduce the amount of computation and improve the computational efficiency.

In some alternative implementations of the above embodiment, the method for adjusting a goods rack pose by a movable robot may further include: sending alarm information in response to determining that the goods rack identifier of the target goods rack does not exist in the goods rack identifier image.

In this implementation, the non-existence of the goods rack identifier of the target goods rack in the goods rack identifier image indicates that the shift distance of the target goods rack is too large, and the safety risk caused accordingly is large. At this point, the operation person should be notified to perform a check to eliminate potential safety hazards.

Figure 4:
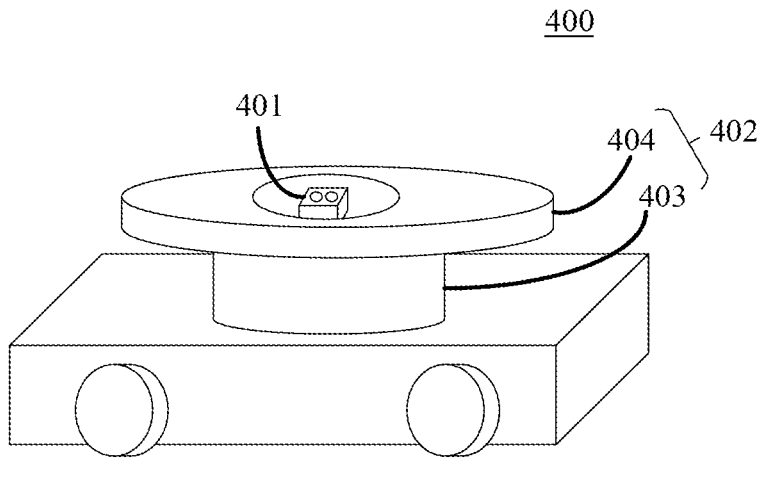
FIG. 4 is a schematic structural diagram of an embodiment of a movable robot according to the present disclosure.

Further referring to FIG. 4, FIG. 4 illustrates a schematic structural diagram of an embodiment of a movable robot in the present disclosure. As shown in FIG. 4, the movable robot 400 includes a first image collection apparatus 401, a jacking-up apparatus 402, and a controller (not shown). Here, the first image collection apparatus 401 is fixedly disposed on the vehicle body of the movable robot and is configured to collect, in a vertical upward direction, an image of a goods rack identifier provided on the bottom surface of a goods rack. The jacking-up apparatus 402 includes a vertical motion component 403 and a rotary motion component 404. The vertical motion component 403 is connected to the rotary motion component 404 and is configured to cause the rotary motion component 404 to move along a vertical direction, and the rotary motion component 404 is configured to cause the goods rack to rotate around the vertical direction. The controller is in communication with the first image collection apparatus 401 and the jacking-up apparatus 402, and is configured to perform the operations in the above method for adjusting a goods rack pose by a movable robot.

In this embodiment, the movable robot may be a storage AGV or may be a storage AMR (Autonomous Mobile Robot). The controller of the movable robot is loaded with the method for adjusting a goods rack pose by a movable robot provided by the above embodiment, and thus controls the movable robot to identify whether a goods rack is shifted and automatically correct the pose of the goods rack when the goods rack is shifted, thereby reducing the operation cost of the warehouse.

In an example, the movable robot is an AGV, and the top of vehicle body of the AGV is provided with a camera. The AGV can determine the real-time position and travel direction of the AGV through a built-in gyroscope. When the AGV travels to a preset collection position of a target goods rack, the controller controls the camera to photograph the goods rack identifier on the bottom surface of the goods rack in a vertically upward direction, and identify the obtained goods rack identifier image to determine whether the target goods rack is shifted. When it is determined that the target goods rack is shifted, the controller generates a transport path based on the difference value between the current pose of the target goods rack and a preset pose, and controls, based on the transport path, the AGV to sequentially perform the following operations: controlling the AGV to travel to the center point of the bottom of the target goods rack; controlling the vertical motion component 403 in the jacking-up apparatus to rise to hold up the target goods rack; controlling the rotation component 404 to cause the target goods rack to rotate to adjust the attitude of the target goods rack to be consistent with the preset attitude; controlling the AGV to move to a position pointed to by the preset pose of the target goods rack; and controlling the vertical motion component to descend to place the target goods rack onto the ground. The pose correction for the target goods rack is completed.

In some alternative implementations of this embodiment, the movable robot further includes a second image collection apparatus (not shown) fixedly disposed on the vehicle body of the movable robot. The second image collection apparatus is configured to collect an image of a preset collection position identifier provided on the ground in a vertically downward direction. The controller is further configured to identify the image of the preset collection position identifier to control the movable robot to move to the preset collection position.

In this implementation, the preset collection position can be marked in the warehouse through the preset collection position identifier. In this way, the movable robot can determine whether the movable robot reaches the preset collection position only by collecting the image of the preset collection position identifier by the second image collection apparatus and identifying the collected image of the preset collection position identifier by the controller.

In some alternative implementations of this embodiment, the rotary motion component 404 includes a horizontally disposed tray. The bottom surface of the tray is connected to the vertical motion component, the central area of the tray is provided with a vertical through-hole, and the central axis of the vertical through-hole is collinear with the rotation axis of the tray. Moreover, the first image collection apparatus 401 is located in an area of the through-hole of the tray projected onto horizontal plane.

In this implementation, the tray is used to lift the target goods rack. When the movable robot adjusts the attitude of the target goods rack, the first image collection apparatus 401 can capture the goods rack identifier image in real time through the through-hole in the center area of the tray. Accordingly, the controller can determine the current attitude of the target goods rack, and update the transport path, thereby improving the accuracy of correcting the attitude of the goods rack.

The movable robot provided in the embodiment of the present disclosure can collect the goods rack identifier image of the target goods rack through the first image collection apparatus, and thus identify the current attitude of the target goods rack and determine whether the target goods rack is shifted. If it is determined that the target goods rack is shifted, the pose of the target goods rack is automatically adjusted to be consistent with the preset pose, which can reduce the operation cost.

An embodiment of the present disclosure further provides a transport system, including a goods rack, an automated guided vehicle and the above movable robot. Here, the center of the bottom surface of the goods rack is provided with a goods rack identifier. The automated guided vehicle is used to transport the goods rack. The movable robot is configured to detect whether the goods rack is shifted, and adjust the pose of the shifted goods rack to a preset pose.

In this embodiment, the automated guided vehicle is used to perform daily transport tasks. The movable robot is used to monitor the pose of the goods rack in the warehouse. If it is detected that the pose of the goods rack is shifted, the movable robot automatically adjusts the pose of the goods rack to be consistent with the preset pose. Accordingly, the potential safety hazard caused by the shift of the pose of the goods rack can be avoided, and the operation cost can be reduced.

In some alternative implementations of this embodiment, the transport system includes at least a first movable robot and a second movable robot, configured to: the first movable robot and the second movable robot respectively detect whether the goods rack is shifted, and the first movable robot and the second movable robot simultaneously determine a shifted goods rack as a to-be-adjusted goods rack. The first movable robot is further configured to adjust the pose of the to-be-adjusted goods rack to the preset pose. The second movable robot is further configured to detect whether the pose of the to-be-adjusted goods rack after the adjustment is shifted, and send alarm information in response to determining that the pose of the to-be-adjusted goods rack after the adjustment is shifted.

In this implementation, the first movable robot and the second movable robot determine the to-be-adjusted goods rack, and the second movable robot detects the pose of the to-be-adjusted goods rack after the adjustment. Accordingly, the fault tolerance of the movable robot in adjusting the pose of the goods rack can be improved, and the shift of the pose of the goods rack that is caused by the failure of the movable robot can be avoided, and thus, the risk can be further reduced.

Figure 5:
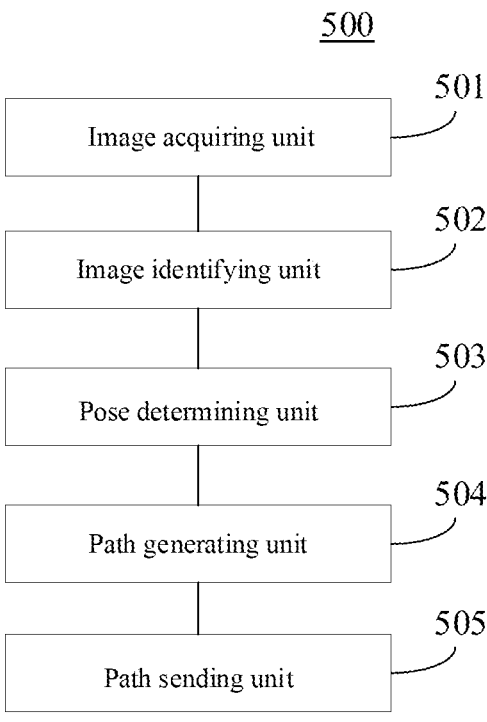
FIG. 5 is a schematic structural diagram of an embodiment of an apparatus for adjusting a goods rack pose by a movable robot according to the present disclosure.

Further referring to FIG. 5, as an implementation of the method shown in the above drawings, the present disclosure provides an embodiment of an apparatus for adjusting a goods rack pose by a movable robot. The embodiment of the apparatus corresponds to the embodiment of the method shown in FIG. 2. The apparatus may be applied in various electronic devices.

As shown in FIG. 5, the apparatus 500 for adjusting a goods rack pose by a movable robot in this embodiment includes: an image acquiring unit 501, configured to acquire a goods rack identifier image of a target goods rack, where the goods rack identifier image is an image obtained by photographing a goods rack identifier of the target goods rack by an image collection apparatus at a preset collection position with a preset collection attitude, and the goods rack identifier comprises a pose identifier of the target goods rack; an image identifying unit 502, configured to identify the pose identifier of the target goods rack from the goods rack identifier image, and determine a current pose of the target goods rack based on the pose identifier of the target goods rack; a pose determining unit 503, configured to determine that the target goods rack is shifted in response to determining that a difference value between the current pose of the target goods rack and a preset pose is greater than a preset deviation threshold; a path generating unit 504, configured to generate, in response to determining that the target goods rack is shifted, a transport path based on the difference value between the current pose of the target goods rack and the preset pose of the target goods rack; and a path sending unit 505, configured to send the transport path to a movable robot to cause the movable robot to adjust the current pose of the target goods rack to be consistent with the preset pose of the target goods rack according to the transport path.

In this embodiment, a projection of a center point of the goods rack identifier onto a horizontal plane coincides with a projection of a center point of the target goods rack onto the horizontal plane, and the pose identifier comprises a length direction identifier of a goods rack, a width direction identifier of the goods rack and a distance identifier. The distance identifier comprises a plurality of area identifiers evenly distributed within the region of the goods rack identifier, and each area identifier represents a relative position of an area where the area identifier is located from the center point of the goods rack identifier. The image identifying unit 502 comprises: a current attitude determining module, configured to determine a current length direction and current width direction of the target goods rack based on a length direction identifier and width direction identifier of the target goods rack in the goods rack identifier image, to obtain a current attitude of the target goods rack; a current position determining module, configured to identify a relative position of the target goods rack relative to the image collection apparatus from the area identifiers in the goods rack identifier image, and determine a current position of the target goods rack based on the relative position of the target goods rack relative to the image collection apparatus and the preset collection position; and a current pose determining module, configured to obtain the current pose of the target goods rack based on the current attitude and current position of the target goods rack.

In this embodiment, the preset collection position is provided with a preset collection position identifier, and the preset collection position identifier comprises a first reference direction identifier and a second reference direction identifier. The apparatus further comprises a preset pose determining unit, configured to: acquire an image of the preset collection position identifier; identify the first reference direction identifier and the second reference direction identifier from the image of the preset collection position identifier; determine a direction indicated by the first reference direction identifier as a preset length direction of the target goods rack and determine a direction indicated by the second reference direction identifier as a preset width direction of the target goods rack to obtain a preset attitude of the target goods rack; determine a center point of the preset collection position identifier as a preset position of the target goods rack; and determine the preset pose of the target goods rack based on the preset attitude and the preset position of the target goods rack.

In this embodiment, the apparatus 500 further comprises: an alarm unit, configured to send alarm information in response to determining that the goods rack identifier of the target goods rack does not exist in the goods rack identifier image.

Figure 6:
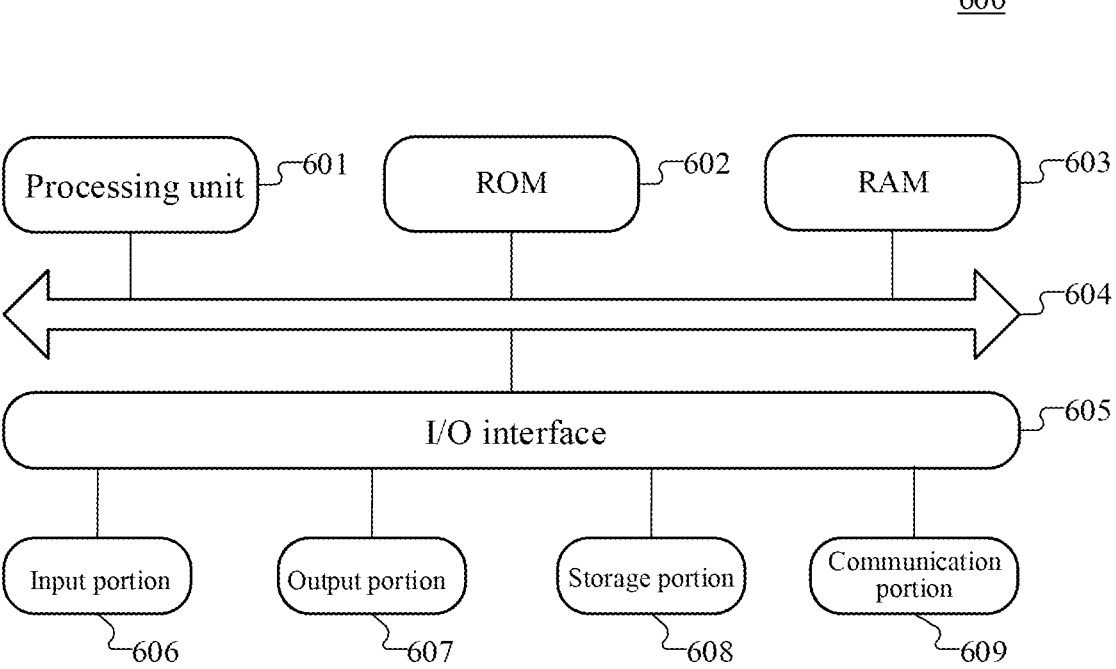
FIG. 6 is a schematic structural diagram of an electronic device adapted to implement embodiments of the present disclosure.

Further referring to FIG. 6, FIG. 6 is a schematic structural diagram of a n electronic device (e.g., the server or terminal device shown in FIG. 1) 600 adapted to implement embodiments of the present disclosure. The terminal device in the embodiments of the present disclosure may include, but not limited to, a mobile terminal such as a mobile phone, a notebook computer, a digital broadcast receiver, a PDA (Personal Digital Assistant) and a PAD (Tablet Computer), and a fixed terminal such as a digital TV and a desktop computer. The terminal device shown in FIG. 6 is merely an example, and should not bring any limitation to the functions and the scope of use of the embodiments of the present disclosure.

As shown in FIG. 6, the computer system 600 may include a processing unit 601 (e.g., a central processing unit (CPU), a graphics processing unit (GPU), etc.), which may execute various appropriate actions and processes in accordance with a program stored in a read-only memory (ROM) 602 or a program loaded into a random access memory (RAM) 603 from a storage portion 608. The RAM 603 also stores various programs and data required by operations of the system 600. The processing unit 601, the ROM 602 and the RAM 603 are connected to each other through a bus 604. An input/output (I/O) interface 605 is also connected to the bus 604.

Generally, the following components are connected to the I/O interface 605: an input portion 606 including a touch screen, a touchpad, a keyboard, a mouse, a camera, a microphone, an accelerometer, a gyroscope etc.; an output portion 607 comprising a cathode ray tube (CRT), a liquid crystal display device (LCD), a speaker, a vibrator, etc.; a storage portion 608 including a magnetic disk, a hard disk and the like; and a communication portion 609. The communication portion 609 may allow electronic device 600 to communicate wirelessly or wirelessly with other devices to exchange data. Although FIG. 6 shows an electronic device 600 with various devices, it should be understood that it is not required to implement or have all the devices shown. More or fewer devices can be implemented alternatively or provided. Each box shown in FIG. 6 can represent one device or multiple devices as required.

In particular, according to embodiments of the present disclosure, the process described above with reference to the flow chart may be implemented in a computer software program. For example, an embodiment of the present disclosure includes a computer program product, which comprises a computer program that is hosted in a machine-readable medium. The computer program comprises program codes for executing the method as illustrated in the flow chart. In such an embodiment, the computer program may be downloaded and installed from a network via the communication portion 609, or may be installed from the storage portion 608, or may be installed from the ROM 602. The computer program, when executed by the processing unit 601, implements the above mentioned functionalities as defined by the methods of the present disclosure. It should be noted that the computer readable medium in the present disclosure may be computer readable signal medium or computer readable storage medium or any combination of the above two. An example of the computer readable storage medium may include, but not limited to: electric, magnetic, optical, electromagnetic, infrared, or semiconductor systems, apparatus, elements, or a combination any of the above. A more specific example of the computer readable storage medium may include but is not limited to: electrical connection with one or more wire, a portable computer disk, a hard disk, a random access memory (RAM), a read only memory (ROM), an erasable programmable read only memory (EPROM or flash memory), a fibre, a portable compact disk read only memory (CD-ROM), an optical memory, a magnet memory or any suitable combination of the above. In some embodiments of the present disclosure, the computer readable storage medium may be any tangible medium containing or storing programs which can be used by a command execution system, apparatus or element or incorporated thereto. In some embodiments of the present disclosure, the computer readable signal medium may include data signal in the base band or propagating as parts of a carrier, in which computer readable program codes are carried. The propagating signal may take various forms, including but not limited to: an electromagnetic signal, an optical signal or any suitable combination of the above. The signal medium that can be read by computer may be any computer readable medium except for the computer readable storage medium. The computer readable medium is capable of transmitting, propagating or transferring programs for use by, or used in combination with, a command execution system, apparatus or element. The program codes contained on the computer readable medium may be transmitted with any suitable medium including but not limited to: wireless, wired, optical cable, RF medium etc., or any suitable combination of the above.

The above computer readable medium may be the computer readable medium included in the above electronic device, or a stand-alone computer readable medium not assembled into the electronic device. The above computer readable medium carries one or more programs. The one or more programs, when executed by the electronic device, cause the electronic device to: acquire a goods rack identifier image of a target goods rack, wherein the goods rack identifier image is an image obtained by photographing a goods rack identifier of the target goods rack by an image collection apparatus at a preset collection position with a preset collection attitude, and the goods rack identifier comprises a pose identifier of the target goods rack; identify the pose identifier of the target goods rack from the goods rack identifier image, and determine a current pose of the target goods rack based on the pose identifier of the target goods rack; determine that the target goods rack is shifted in response to determining that a difference value between the current pose of the target goods rack and a preset pose is greater than a preset deviation threshold; generate, in response to determining that the target goods rack is shifted, a transport path based on the difference value between the current pose of the target goods rack and the preset pose; and send the transport path to a movable robot to cause the movable robot to adjust the current pose of the target goods rack to be consistent with the preset pose according to the transport path A computer program code for executing operations in some embodiments of the present disclosure may be compiled using one or more programming languages or combinations thereof. The programming languages include object-oriented programming languages, such as Java, Smalltalk or C++, and also include conventional procedural programming languages, such as "C" language or similar programming languages. The program code may be completely executed on a user's computer, partially executed on a user's computer, executed as a separate software package, partially executed on a user's computer and partially executed on a remote computer, or completely executed on a remote computer or server. In the circumstance involving a remote computer, the remote computer may be connected to a user's computer through any network, including local area network (LAN) or wide area network (WAN), or may be connected to an external computer (for example, connected through Internet using an Internet service provider).

The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion comprising one or more executable instructions for implementing specified logic functions. It should also be noted that, in some alternative implementations, the functions denoted by the blocks may occur in a sequence different from the sequences shown in the figures. For example, any two blocks presented in succession may be executed, substantially in parallel, or they may sometimes be in a reverse sequence, depending on the function involved. It should also be noted that each block in the block diagrams and/or flow charts as well as a combination of blocks may be implemented using a dedicated hardware-based system executing specified functions or operations, or by a combination of a dedicated hardware and computer instructions.

The described units involved in the embodiments of the present disclosure may be implemented by means of software or hardware. The described unit can alternatively be provided in a processor, which, for example, can be described as: a processor including an image acquiring unit, an image identifying unit, a pose determining unit; a path generating unit and a path sending unit. Here, the names of these units do not in some cases constitute a limitation to such units themselves. For example, the image acquiring unit may alternatively be described as "a unit for acquiring a goods rack identifier image of a target goods rack."

The above description only provides an explanation of the preferred embodiments of the present disclosure and the technical principles used. It should be appreciated by those skilled in the art that the inventive scope of the present disclosure is not limited to the technical solutions formed by the particular combinations of the above-described technical features. The inventive scope should also cover other technical solutions formed by any combinations of the above-described technical features or equivalent features thereof without departing from the concept of the disclosure. Technical schemes formed by the above-described features being interchanged with, but not limited to, technical features with similar functions disclosed in the present disclosure are examples.

What is claimed is:

1. A method for adjusting, by a movable robot, a current pose of a goods rack which has deviated from a preset pose, the method comprising:

whilst a target goods rack is standing on a surface:

acquiring a goods rack identifier image of the target goods rack, wherein the goods rack identifier image is an image obtained by photographing the goods rack identifier of the target goods rack by an image collection apparatus at a preset collection position with a preset collection attitude, the image collection apparatus is disposed on a vehicle body of the movable robot, and the goods rack identifier comprises a pose identifier of the target goods rack, wherein a center of a bottom surface of the target goods rack is provided with the goods rack identifier which is an imageable sign, wherein a projection of a center point of the goods rack identifier onto a horizontal plane coincides with a projection of a center point of the target goods rack onto the horizontal plane, wherein the pose identifier comprises: a length direction identifier of a goods rack, a width direction identifier of the goods rack, and a distance identifier, wherein the length direction identifier and the width direction identifier are elements of the imageable sign, and wherein the distance identifier comprises: a plurality of area identifiers evenly distributed within a region of the goods rack identifier, each area identifier represents a relative position of an area where the area identifier is located from the center point of the goods rack identifier;

identifying the pose identifier of the target goods rack from the goods rack identifier image, and determining the current pose of the target goods rack based on the pose identifier of the target goods rack;

determining, that the target goods rack is shifted, in response to determining that a difference value between the current pose of the target goods rack and the preset pose of the target goods rack is greater than a preset deviation threshold;

generating, in response to determining that the target goods rack is shifted, a transport path based on the difference value between the current pose of the target goods rack and the preset pose of the target goods rack;

controlling the movable robot by sending the transport path to the movable robot, wherein the transport path represents an instruction to cause the movable robot to adjust the current pose of the target goods rack to be consistent with the preset pose of the target goods rack; and then adjusting, by the movable robot, the current pose of the target goods rack to be consistent with the preset pose of the target goods rack according to the transport path;

wherein the determining a current pose of the target goods rack based on the pose identifier of the target goods rack comprises:

orientating the movable robot at the preset collection position into the preset collection attitude, by aligning a coordinate axis in an image coordinate system of the image collection apparatus with one of a first reference direction identifier and a second reference direction identifier which are provided by a preset collection position identifier on a ground surface:

determining angles of a current length direction and a current width direction of the target goods rack relative to the image coordinate system of the image collection apparatus based on the length direction identifier and the width direction identifier of the target goods rack in the photographed goods rack identifier in the goods rack identifier image, to obtain a relative attitude of the target goods rack with respect to the image collection apparatus;

identifying a relative position of the target goods rack relative to the image collection apparatus from the area identifiers in the goods rack identifier image, and determining a current position of the target goods rack based on the relative position of the target goods rack relative to the image collection apparatus and the preset collection position; and obtaining the current pose of the target goods rack based on the relative attitude and current position of the target goods rack.

2. The method according to claim 1, wherein the preset collection position is provided with the preset collection position identifier, the preset collection position identifier comprises the first reference direction identifier and the second reference direction identifier, and the method further comprises: acquiring an image of the preset collection position identifier; identifying the first reference direction identifier and the second reference direction identifier from the image of the preset collection position identifier; determining a direction indicated by the first reference direction identifier as a preset length direction of the target goods rack, and determining a direction indicated by the second reference direction identifier as a preset width direction of the target goods rack, to obtain a preset attitude of the target goods rack; determining a center point of the preset collection position as a preset position of the target goods rack; and determining the preset pose of the target goods rack based on the preset attitude and the preset position of the target goods rack.

3. The method according to claim 1, further comprising: sending alarm information, in response to determining that the goods rack identifier of the target goods rack does not exist in the goods rack identifier image.

4. A non-transitory computer readable medium, storing a computer program, wherein the program, when executed by a processor, implements the method according to claim 1.

5. The method according to claim 1, wherein the length direction indicator and the width direction indicator are each a directional sign which is displayed in the goods rack identifier which comprises a two-dimensional image.

6. The method according to claim 1, wherein the goods rack identifier comprises an image with grids arranged at intervals as the pose identifier, wherein a side length of each grid area is a calibration length, and an extension direction of the side length is parallel to the length direction or the width direction of the target goods rack.

7. The method according to claim 1, wherein a goods rack coordinate system is established with the center point of the goods rack identifier as an origin and the length direction and width direction of the target goods rack as coordinate axes, and a representation of the coordinate axes is displayed in the goods rack identifier.

8. The method according to claim 7, wherein the relative position information of each of the plurality of area identifiers in the goods rack identifier relative to the center point of the goods rack identifier is encoded in advance by embedding a coordinate value into each area identifier respectively.

9. The method according to claim 1, wherein a two-dimensional code image is used for each of the plurality of the area identifiers in the goods rack identifier, each two-dimensional code image is a square with equal side lengths, and an extension direction of the side length of the two-dimensional code image is parallel to the length direction or width direction of the target goods rack.

10. An apparatus for adjusting, by a movable robot, a current pose of a goods rack which has deviated from a preset pose, the apparatus comprising:
  one or more processors; and
  a data storage device which stores one or more computer programs,
    wherein the one or more computer programs, when executed by the one or more processors, cause the one or more processors to implement operations, the operations comprising:
    whilst a target goods rack is standing on a surface:
    acquiring a goods rack identifier image of the target goods rack,
    wherein the goods rack identifier image is an image obtained by photographing the goods rack identifier of the target goods rack by an image collection apparatus at a preset collection position with a preset collection attitude,
    the image collection apparatus is disposed on a vehicle body of the movable robot, and the goods rack identifier comprises a pose identifier of the target goods rack,
      wherein a center of a bottom surface of the goods rack is provided with the goods rack identifier which is an imageable sign,
      wherein a projection of a center point of the goods rack identifier onto a horizontal plane coincides with a projection of a center point of the target goods rack onto the horizontal plane, wherein the pose identifier comprises: a length direction identifier of a goods rack, a width direction identifier of the goods rack, and a distance identifier,
      wherein the length direction identifier and the width direction identifier are elements of the imageable sign, and
      wherein the distance identifier comprises: a plurality of area identifiers evenly distributed within a region of the goods rack identifier, each area identifier represents a relative position of an area where the area identifier is located from the center point of the goods rack identifier;
    identifying the pose identifier of the target goods rack from the goods rack identifier image, and determining the current pose of the target goods rack based on the pose identifier of the target goods rack;
    determining, by a controller in communication with the image collection apparatus, that the target goods rack is shifted, in response to determining that a difference value between the current pose of the target goods rack and the preset pose is greater than a preset deviation threshold;
    generating, in response to determining that the target goods rack is shifted, a transport path based on the difference value between the current pose of the target goods rack and the preset pose of the target goods rack;
    controlling the movable robot by sending the transport path to the movable robot, wherein the transport path represents an instruction to cause the movable robot to adjust the current pose of the target goods rack to be consistent with the preset pose of the target goods rack; and then
    adjusting, by the movable robot, the current pose of the target goods rack to be consistent with the preset pose of the target goods rack according to the transport path;
    wherein the determining a current pose of the target goods rack based on the pose identifier of the target goods rack comprises: orientating the movable robot at the preset collection position into the preset collection attitude, by aligning a coordinate axis in an image coordinate system of the image collection apparatus with one of a first reference direction identifier and a second reference direction identifier which are provided by a preset collection position identifier on a ground surface;
    determining angles of a current length direction and a current width direction of the target goods rack relative to the image coordinate system of the image collection apparatus based on the length direction identifier and the width direction identifier of the target goods rack in the photographed goods rack identifier in the goods rack identifier image, to obtain a relative attitude of the target goods rack with respect to the image collection apparatus;
    identifying a relative position of the target goods rack relative to the image collection apparatus from the area identifiers in the goods rack identifier image, and
    determining a current position of the target goods rack based on the relative position of the target goods rack relative to the image collection apparatus and the preset collection position; and
    obtaining the current pose of the target goods rack based on the relative and current position of the target goods rack.

11. The apparatus according to claim 10, wherein the preset collection position is provided with the preset collection position identifier, the preset collection position identifier comprises the first reference direction identifier and the second reference direction identifier, and the operations further comprise:

acquiring an image of the preset collection position identifier; identifying the first reference direction identifier and the second reference direction identifier from the image of the preset collection position identifier; determining a direction indicated by the first reference direction identifier as a preset length direction of the target goods rack, and determining a direction indicated by the second reference direction identifier as a preset width direction of the target goods rack to obtain a preset attitude of the target goods rack; determining a center point of the preset collection position identifier as a preset position of the target goods rack; and determining the preset pose of the target goods rack based on the preset attitude and the preset position of the target goods rack.

12. The apparatus according to claim 11, wherein the operations further comprise:

sending alarm information in response to determining that the goods rack identifier of the target goods rack does not exist in the goods rack identifier image.

13. A system for a warehouse comprising:

a target goods rack, wherein a center of a bottom surface of the target goods rack is provided with a goods rack identifier which is an imageable sign, wherein a projection of a center point of the goods rack identifier onto a horizontal plane coincides with a projection of a center point of the target goods rack onto the horizontal plane, wherein the goods rack identifier comprises a pose identifier of a target goods rack, the pose identifier comprises: a length direction identifier of a goods rack, a width direction identifier of the goods rack, and a distance identifier, wherein the length direction identifier and the width direction identifier are elements of the imageable sign, and wherein the distance identifier comprises: a plurality of area identifiers evenly distributed within a region of the goods rack identifier, each area identifier represents a relative position of an area where the area identifier is located from the center point of the goods rack identifier;

a movable robot for adjusting a current pose of the target goods rack, comprising a first image collection apparatus, a jacking-up apparatus for lifting the target goods rack off a ground surface and rotating the target goods rack, and a controller the dimensions of the movable robot are such that the movable robot can move under the target goods rack;

wherein the first image collection apparatus is a camera which is fixedly disposed on a vehicle body of the movable robot, and is configured so that the field of view of the first image collection apparatus points vertically upward to collect, an image of the goods rack identifier provided on the bottom surface of the target goods rack;

the jacking-up apparatus disposed on the movable robot comprises a vertical motion component and a rotary motion component, the vertical motion component is connected to the rotary motion component and is configured to cause the rotary motion component to move along a vertical direction to support and thereby lift the target goods rack from standing on the ground surface into a lifted position via a load-bearing surface of the rotary motion component and to lower the target goods rack from the lifted position to stand on the ground surface, and the rotary motion component is configured to cause the target goods rack to rotate around the vertical direction when in the lifted position; and the controller is in communication with the first image collection apparatus and the jacking-up apparatus, and is configured to perform operations, the operations comprising: whilst the target goods rack is standing on a surface: acquiring a goods rack identifier image of the target goods rack, wherein the goods rack identifier image is an image obtained by photographing the goods rack identifier of the target goods rack by the first image collection apparatus at a preset collection position with a preset collection attitude; identifying the pose identifier of the target goods rack from the goods rack identifier image, and determining the current pose of the target goods rack based on the pose identifier of the target goods rack; determining that the target goods rack is shifted, in response to determining that a difference value between the current pose of the target goods rack and a preset pose of the target goods rack is greater than a preset deviation threshold;

generating, in response to determining that the target goods rack is shifted, a transport path based on the difference value between the current pose of the target goods rack and the preset pose of the target goods rack;

controlling the movable robot by sending the transport path to the movable robot, wherein the transport path represents an instruction of a path along which the movable robot is to move to transport the target goods rack to adjust the current pose of the target goods rack to be consistent with the preset pose of the target goods rack; and then adjusting, by the movable robot, the current pose of the target goods rack to be consistent with the preset pose of the target goods rack according to the transport path;

the determining a current pose of the target goods rack based on the pose identifier of the target goods rack comprises:

orientating the movable robot at the preset collection position into the preset collection attitude, by aligning a coordinate axis in an image coordinate system of the first image collection apparatus with one of a first reference direction identifier and a second reference direction identifier which are provided by a preset collection position identifier on a ground surface:

determining angles of a current length direction and a current width direction of the target goods rack relative to the image coordinate system of the first image collection apparatus based on the length direction identifier and the width direction identifier of the target goods rack in the photographed goods rack identifier in the goods rack identifier image, to obtain a relative attitude of the target goods rack with respect to the first image collection apparatus;

identifying a relative position of the target goods rack relative to the first image collection apparatus from the area identifiers in the goods rack identifier image, and determining a current position of the target goods rack based on the relative position of the target goods rack relative to the first image collection apparatus and the preset collection position; and obtaining the current pose of the target goods rack based on the relative attitude and current position of the target goods rack.

14. The system according to claim 13, further comprising a second image collection apparatus which is a camera that is fixedly disposed on the vehicle body of the movable robot, wherein the second image collection apparatus is configured to collect by an image sensor an image of a preset collection position identifier provided on ground in a vertically downward direction, and the controller is further configured to identify the image of the preset collection position identifier, to control the movable robot to move to a preset collection position.

15. The system according to claim 13, wherein the rotary motion component comprises a horizontally disposed tray, a bottom surface of the tray is connected to the vertical motion component, a central area of the tray is provided with a vertical through-hole, a central axis of the vertical through-hole is collinear with a rotation axis of the tray, and the first image collection apparatus is located in an area of the through-hole of the tray projected onto a horizontal plane.

16. The system according to claim 13, further comprising: an automated guided vehicle, the automated guided vehicle is used to transport the goods rack, and the movable robot is configured to detect whether the goods rack is shifted, and adjust a pose of the shifted goods rack to a preset pose.

17. The system according to claim 16, comprising at least a first movable robot and a second movable robot, wherein the first movable robot and the second movable robot are configured to: the first movable robot and the second movable robot respectively detect whether the goods rack is shifted, and the first movable robot and the second movable robot simultaneously determine the shifted goods rack as a to-be-adjusted goods rack, the first movable robot is further configured to adjust a pose of the to-be-adjusted goods rack to a preset pose, and the second movable robot is further configured to detect whether the pose of the to-be-adjusted goods rack after the adjustment is shifted, and send alarm information in response to determining that the pose of the to-be-adjusted goods rack after the adjustment is shifted.

18. The movable robot according to claim 13 or 14, wherein the movable robot is an autonomous guided robot.

\* \* \* \* \*